(12) United States Patent
Bell et al.

(10) Patent No.: US 12,228,940 B2
(45) Date of Patent: Feb. 18, 2025

(54) SELF-PROPELLED PROCESSING DEVICE

(71) Applicant: Vorwerk & Co. Interholding GmbH, Wuppertal (DE)

(72) Inventors: Marcus Bell, Duesseldorf (DE); David Erkek, Aarau (CH); Lars Schlueter, Zurich (CH); Dennis Schulz, Duisburg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 274 days.

(21) Appl. No.: 17/859,235

(22) Filed: Jul. 7, 2022

(65) Prior Publication Data

US 2023/0019872 A1    Jan. 19, 2023

(30) Foreign Application Priority Data

Jul. 9, 2021    (EP) ..................................... 21184654

(51) Int. Cl.
*G01C 21/00* (2006.01)
*A47L 9/28* (2006.01)
*G05D 1/00* (2024.01)

(52) U.S. Cl.
CPC .......... *G05D 1/0274* (2013.01); *A47L 9/2805* (2013.01); *A47L 9/2852* (2013.01);
(Continued)

(58) Field of Classification Search
CPC .. G05D 1/0274; G05D 1/0044; G05D 1/0236; G05D 1/0221; G05D 1/0223; G05D 1/024; G05D 1/0246; G05D 1/0285; G05D 1/40; G05D 1/43; G05D 1/60; G05D 1/646; G05D 1/65; G05D 1/80; G05D 1/86; G05D 2101/00; G05D 2105/00; G05D 2105/10; G05D 2107/00; G05D 2107/40; G05D 2109/00; G05D 2109/10; G05D 2111/00;
(Continued)

(56) References Cited

U.S. PATENT DOCUMENTS

2011/0167574 A1* 7/2011 Stout ........................ B25J 9/163
  701/25
2013/0206177 A1* 8/2013 Burlutskiy ........... G05D 1/0274
  15/319

(Continued)

FOREIGN PATENT DOCUMENTS

DE    10 2008 014 912 A1    9/2009
DE    10 2011 000 536 A1    8/2012
(Continued)

*Primary Examiner* — Jelani A Smith
*Assistant Examiner* — Alyssa Rorie
(74) *Attorney, Agent, or Firm* — Collard & Roe, P.C.

(57) ABSTRACT

A self-propelled floor processing device with an evaluation unit, which is designed to navigate the floor processing device within an environment based on an area map and, during a movement, to determine a behavior parameter of the floor processing device and a movement path of the floor processing device. The evaluation unit is set up to analyze the behavior parameter and movement path, automatically determine a no-go area which the floor processing device must not traverse depending on the result of the analysis, and enter the determined no-go area in the area map or change a no-go area already entered in the area map.

19 Claims, 5 Drawing Sheets

(52) U.S. Cl.
CPC ........ *A47L 9/2894* (2013.01); *G01C 21/3859* (2020.08); *A47L 2201/04* (2013.01)

(58) Field of Classification Search
CPC ............ G05D 2111/30; G05D 2111/32; G05D 2111/60; A47L 9/2805; A47L 9/2852; A47L 9/2894; A47L 2201/04; G01C 21/3859

See application file for complete search history.

(56) References Cited

U.S. PATENT DOCUMENTS

| | | | |
|---|---|---|---|
| 2018/0364045 A1* | 12/2018 | Williams | G01S 17/88 |
| 2019/0204851 A1* | 7/2019 | Afrouzi | A47L 9/0405 |
| 2019/0298139 A1* | 10/2019 | Takaoka | A47L 9/2826 |
| 2020/0064858 A1 | 2/2020 | Arnold et al. | |
| 2020/0150655 A1* | 5/2020 | Artes | G05D 1/0016 |
| 2020/0225673 A1* | 7/2020 | Ebrahimi Afrouzi | G06N 5/04 |
| 2020/0375429 A1* | 12/2020 | Munich | G05D 1/0219 |
| 2020/0397202 A1* | 12/2020 | Artes | G05D 1/0274 |

FOREIGN PATENT DOCUMENTS

| | | |
|---|---|---|
| EP | 2 294 960 B1 | 12/2015 |
| EP | 3 613 321 B1 | 4/2021 |

\* cited by examiner

| Behavior parameter | Location | Reference behavior parameter | Set up no-go area (5) |
|---|---|---|---|
| 60 turning maneuver / m² | Dining room (14) in the area of the dining set | ≤ 50 turning maneuver / m² | Yes |
| Duration of stay 10 min/m² | Living room (15) in the area of the loudspeakers | ≤ 2 min/m² | Yes |
| Wheel (11) without floor contact 1x | Chairs in the dining room (14) | 0 | Yes |

Fig. 5

SELF-PROPELLED PROCESSING DEVICE

CROSS REFERENCE TO RELATED APPLICATIONS

Applicant claims priority under 35 U.S.C. § 119 of European Application No. 21184654.8 filed Jul. 9, 2021, the disclosure of which is incorporated by reference.

BACKGROUND OF THE INVENTION

1. Field of the Invention

The invention relates to a self-propelled floor processing device with an evaluation unit, which is designed to navigate the floor processing device within an environment based on an area map, and, during a movement, to determine a behavior parameter of the floor processing device and a movement path of the floor processing device.

The invention further relates to a method for operating a self-propelled floor processing device, wherein an evaluation unit of the floor processing device navigates the floor processing device within an environment based on an area map, and, during a movement, determines a behavior parameter of the floor processing device and a movement path of the floor processing device.

2. Description of the Related Art

Floor processing devices of the aforementioned kind are known in prior art in a plurality of different embodiments. For example, the floor processing devices can involve cleaning devices, polishing devices, lawnmowing devices or others. In particular, the self-propelled floor processing device can be designed as a mobile vacuuming and/or mopping robot.

Publications DE 10 2011 000 536 A1 and DE 10 2008 014 912 A1 disclose self-propelled robots for cleaning floors. The robots are equipped with distance sensors, which can measure distances to obstacles, for example pieces of furniture or room boundaries. An area map is generated from the measured distance data, based on which a movement route can be planned that avoids a collision with obstacles. The distance sensors preferably operate without contact, for example with the help of light and/or ultrasound. It is further known to provide the robot with means for all-round distance measurement, for example with an optical triangulation system, which is arranged on or around a platform that rotates around a vertical axis or the like. The acquired distance data to obstacles are processed into an area map and stored by means of a computing device of the robot, so that the robot can access this area map in the course of a work operation, so as to orient itself within the environment.

Recording an area map or area data during a reconnaissance trip is further known in the prior art, for example from EP 2 294 960 B1. The reconnaissance trip is controlled either by the floor processing device itself, or manually within the framework of a so-called teach-in by a user, wherein the user manually controls the cleaning device through the environment, for example by means of a remote control. It is here likewise known to input area boundaries and/or define so-called no-go areas within which the cleaning robot cannot travel, for example by taking an instructive drive of the environment.

Further known from EP 3 613 321 B1 (also published as US 2020/0064858 A1) is to analyze device parameters and/or environmental parameters detected by the floor processing device while processing a floor for purposes of self-learning error prevention in relation to recurring patterns, which are characterized by a repeatedly arising combination of an error and at least one chronologically preceding environmental and/or device parameter.

As a result of the above, the floor processing device acts proactively during navigation to avoid error situations from which it cannot automatically extricate itself and/or which prevent a further processing of the surface to be processed.

The disadvantage to the aforementioned floor processing devices or to the method for their operation is that an evaluation unit of the floor processing device must always evaluate a wide variety of currently and previously detected parameters, so as to achieve a self-learning effect that replaces the manual input of no-go areas by the user.

SUMMARY OF THE INVENTION

Proceeding from the aforementioned prior art, it is therefore the object of the invention to design the floor processing device in such a way that it avoids an occurrence of future error situations, while having to use as little computing capacity as possible in the process.

In order to achieve the aforementioned object, it is proposed that the evaluation unit of the floor processing device be set up to analyze the behavior parameter and movement path, automatically determine a no-go area which the floor processing device must not traverse depending on the result of the analysis, and enter the determined no-go area in the area map or change a no-go area already entered in the area map.

According to the invention, the evaluation unit of the floor processing device is now itself suitable for automatically defining or changing a no-go area within the environment. A manual intervention by a user, in particular within the framework of a reconnaissance trip, is no longer required. The evaluation unit of the floor processing device evaluates at least one behavior parameter of the floor processing device and a current movement path, in particular a current location of the floor processing device on the movement path, so as to detect a potential error behavior of the floor processing device, for example an accident situation. A no-go area within the area map which the floor processing device must not traverse can then be defined for a location where an error situation arose. In general, the term no-go area denotes a partial area in the environment blocked for movement by the floor processing device, which the floor processing device must not enter. A no-go area is usually defined by virtual area limits that the floor processing device must not cross. The area limits are preferably shown or stored as lines in the area map. The movement path of the floor processing device is preferably recorded by the detection unit during a floor processing activity, for example by a camera, a laser scanner and/or an inertial sensor, wherein the evaluation of the collected information is handled by the evaluation unit of the floor processing device. The evaluation unit processes the collected information completely automatically, so that the user does not have to take any additional steps to record one or several no-go areas in the area map. Instead, the analysis and generation, processing and/or expansion of the area map are handled completely automatically by the evaluation unit of the floor processing device. The behavior parameter of the floor processing device characterizes either a usual and proper behavior of the floor processing device during floor processing, or a behavior deviating from a norm, which is usually characterized by an error or an undesired situation. If the evaluation unit determines that such an undesired behavior parameter arises at a specific location of the movement path, in particular repeatedly over an observation period, a no-go area can be defined for this location of the movement path, which denotes an area of the environment that the floor processing device must not traverse. In particular, a no-go line can be defined, which the floor processing device must not cross. Entering the no-go line or no-go area in the area map can also involve setting just one corresponding link for the respective location in the area map. Alternatively, however, it is also possible for the no-go line or no-go area to be entered directly in the area map, i.e., stored therein. If the area map already contains a no-go area or a no-go line, the latter can be changed as a function of a current analysis result; for example, a no-go area can be enlarged if a new error case arises in direct proximity to the already stored no-go area. As a consequence, the solution according to the invention especially advantageously eliminates the need to continuously reanalyze device parameters or environmental parameters in relation to a potential error behavior. Instead, no-go areas which the floor processing device must basically not traverse are set in the area map. This then helps to avoid errors or undesired situations in the future as well.

Within the meaning of the invention, a self-propelled floor processing device is a vacuuming robot, mopping robot, mowing robot or the like, for example. The self-propelled floor processing device usually has a navigation unit, which the floor processing unit can use to orient and localize itself in the environment. For example, the navigation system contains a distance sensor like a 3D laser scanner or the like, which is used to measure distances to obstacles in the environment. Based on the measured distances, the automatically operated floor processing device can generate an area map, which contains a layout of the environment, for example a layout of a home or at least one or several rooms, as well as boundaries of objects, for example pieces of furniture, decorative objects, and the like. For example, the area map can be generated by means of a so-called SLAM (simultaneous localization and measurement) algorithm. In particular, a work plan can then also be generated for the floor processing device based on the area map, within the framework of which a plurality of floor processing steps is preplanned. For example, the floor processing plan can provide a first floor processing activity at a first time at a first location in the environment, while a second floor processing activity is preplanned for a later time at the same or a different location in the environment. By automatically defining no-go areas in the area map according to the invention, the preplanned floor processing activities can then possibly also be changed, in particular varied in relation to their sequence of execution. In particular, partial areas of the environment can be reprioritized for executing a floor processing activity by defining a sequence of the partial environmental areas planned for floor processing.

In addition, it is proposed that the evaluation unit be set up to compare the behavior parameter with at least one defined reference behavior parameter. The defined reference behavior parameters are used to detect a situation which requires or recommends that a no-go area be entered or changed in the area map. The defined reference behavior parameters can preferably be stored in a local memory of the floor processing device, or also in an external memory, for example on a server of the manufacturer of the floor processing device, wherein the evaluation unit of the floor processing device accesses the stored reference behavior parameters, for example via wireless communication, so as to store or change a no-go area depending on the result of comparing a current behavior parameter of the floor processing device with one or several defined reference behavior parameters.

For example, a defined reference behavior parameter can be a defined movement speed of the floor processing device, a defined drift of the floor processing device, a defined duration of stay of the floor processing device per unit area of the environment, a defined number of turning maneuvers of the floor processing device per defined partial area of the environment or a defined power consumption of a drive unit of the floor processing device per unit time. In addition, still other reference behavior parameters can be defined, which relate to a behavior in an error-free or properly running floor processing situation of the floor processing device. By contrast, an unusually long stay of the robot in a specific area can be an example of a situation to be avoided, wherein the unusually long stay is characterized by a stay that is longer than a defined maximum stay, for example one assumed per area of the environment. For example, the unusually long stay can be caused by a specific floor covering, or by virtue of an obstacle existing in the respective partial environmental area in which the floor processing device gets stuck and/or in which the floor processing device must perform a plurality of turning maneuvers. In this respect, for example, a defined number of turning maneuvers of the floor processing device per defined partial area of the environment or per defined unit of time can be alternatively prescribed as the reference parameter. Alternatively measurable as well is a power consumption of a drive unit, for example a drive unit for drive wheels of the floor processing device, which is routinely higher on a carpeted floor than on a smooth floor covering, in particular a hard floor. A type of floor covering can also make it more difficult to traverse by the floor processing device. On carpeted floors, the pile height can result in a measurably significant reduction in traveling speed, which is caused by the high frictional resistance. In addition, a pole direction of the carpet fibers can lead to a drift, so that the floor processing device is forced into a curve or inclined position despite an equally dimensioned drive of the drive wheels. In these cases as well, a problem or undesired situation is detected by analyzing the travel data, i.e., the behavior parameters, and ideally used for defining a no-go area. During a subsequent floor processing or movement of the floor processing device through the environment, the floor processing device is then precluded from moving into the error-prone partial environmental area, since the latter was previously "blocked" by a no-go area, thereby avoiding a repetition of the erroneous situation in advance.

It can be provided that the reference behavior parameter be predefined by a manufacturer of the floor processing device, or manually definable by a user of the floor processing device. In the first mentioned case, the manufacturer already defines a plurality of reference behavior parameters, which regularly lead to an error case or an improper functioning of the floor processing device. If necessary, the user of the floor processing device can still revise, delete, or change such predefined reference behavior parameters. Alternatively, it can be provided that the user of the floor processing device him or herself define reference behavior parameters that serve to compare the current behavior parameters of the floor processing device, so as to then decide whether a no-go area should be set or not. For example, the user of the floor processing device can find certain situations to be inconvenient in and of themselves, since they are accompanied by an increased stay or an increased noise level of the floor processing device, for example if the floor processing device intensively tries to clean a partial environmental area that has a plurality of chair legs, and thus necessitates a plurality of turning maneuvers. In this respect, for example, the user can then decide that manually cleaning this partial environmental area is more advantageous, and generally specify a reference behavior parameter that defines a maximum number of turning maneuvers per partial environmental area which the floor processing device can still perform. If the reference behavior parameter is then exceeded when first performing a floor processing activity, a no-go area is automatically set for the respective partial environmental area. During a subsequent movement through the environment, the floor processing device will then no longer traverse the partial environmental area defined by the no-go area. To enter reference behavior parameters, the user can especially preferably use an application installed on an external terminal, for example a mobile phone or tablet computer of the user. The external terminal communicates wirelessly with the floor processing device, so as to transmit the reference behavior parameters. An area map can likewise be transmitted from the floor processing device to the external terminal via this communication channel.

In addition, it can be provided that the evaluation unit be set up to display the determined no-go area in the area map to a user, in particular to transmit the determined no-go area to an external terminal that communicates with the floor processing device. As a consequence, the user is shown the area map complete with the determined no-go area, in particular on a terminal external to the floor processing device, in particular a mobile phone or the like. The no-go area can be displayed either on an external terminal as explained before, or on a display of the floor processing device. It is recommended that the no-go areas stored in the area map be specially labelled, for example in color or with an excessive line width, so that the user receives a direct impression about the partial environmental area not to be processed by the floor processing device.

In particular, it can be provided that the evaluation unit be set up to display the determined no-go area to a user as provisionally marked before the no-go area is stored in the area map. As a consequence, the no-go area in this embodiment is not directly stored in the area map, with storage instead requiring the prior consent of the user. Based on the provisional entries in the area map, the user can check the location of the no-go areas, and then either reject or accept the proposed no-go area. Alternatively or additionally, it can also be provided that the user can shift the no-go area, change its size or the like. Only once the user has confirmed the entry of the no-go area in the area map is it set permanently, and thus effective for an operating activity of the floor processing device, as a result of which the floor processing device excludes this no-go area as it moves through the environment.

In this sense, it can be provided in particular that the evaluation unit be set up to prompt the user to confirm storage of the no-go area. For this purpose, the display of the floor processing device or the external terminal can especially preferably be provided with selection fields, which confirm or reject the storage with a "yes" or "no".

In addition, it is proposed that the evaluation unit be set up to define a no-go area only for consideration during a specific operating mode of the floor processing device. In particular, the operating mode can involve processing a floor with a specific processing intensity. According to this embodiment, different guidelines can be set for different floor processing tasks in relation to the definition of no-go areas. For example, specific partial environmental areas can be excluded from floor processing as a no-go area if the floor processing device is to implement a "quick basic cleaning" mode. By contrast, given a defined "intensive cleaning", the partial environmental areas defined as a no-go area can nevertheless be traversed by the floor processing device, with it then being accepted that an undesired situation might arise, for example a lengthened stay of the floor processing device in the respective partial environmental area, an elevated power consumption or noise generation of the floor processing device, and the like. As a consequence, a floor processing operation with a defined processing intensity can be provided in the sense of a "specific operating mode", for example differentiated as eco-mode, normal mode, and intensive mode.

In addition, it is proposed that the evaluation unit be set up to display a frequency with which a specific behavior parameter of the floor processing device arises along the movement path to a user in the area map. In particular, the frequency display can take place in a heat map. According to this embodiment, the evaluation unit can indicate problem areas in the area map and visually identify them for a user, in particular by graphically highlighting the frequency with which problem cases arise or a time spent by the floor processing device in a specific partial environmental area, for example by the size of a defined symbol or a specific coloration.

Aside from the floor processing device described above, the invention further also proposes a method for operating a self-propelled floor processing device, wherein an evaluation unit of the floor processing device navigates the floor processing device within an environment based on an area map, and, during a movement, determines a behavior parameter of the floor processing device and a movement path of the floor processing device, wherein the evaluation unit analyzes the behavior parameter and the movement path, automatically determines a no-go area which the floor processing device must not traverse depending on the result of the analysis, and enters the determined no-go area in the area map or changes a no-go area (5) already entered in the area map (3). In particular, the method can be provided for operating a floor processing device according to the invention. As a consequence, the aforementioned features and advantages of the floor processing device also correspondingly apply to the method according to the invention. To avoid repetition, reference is hereby thus made to the functionality of the floor processing device as described above.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
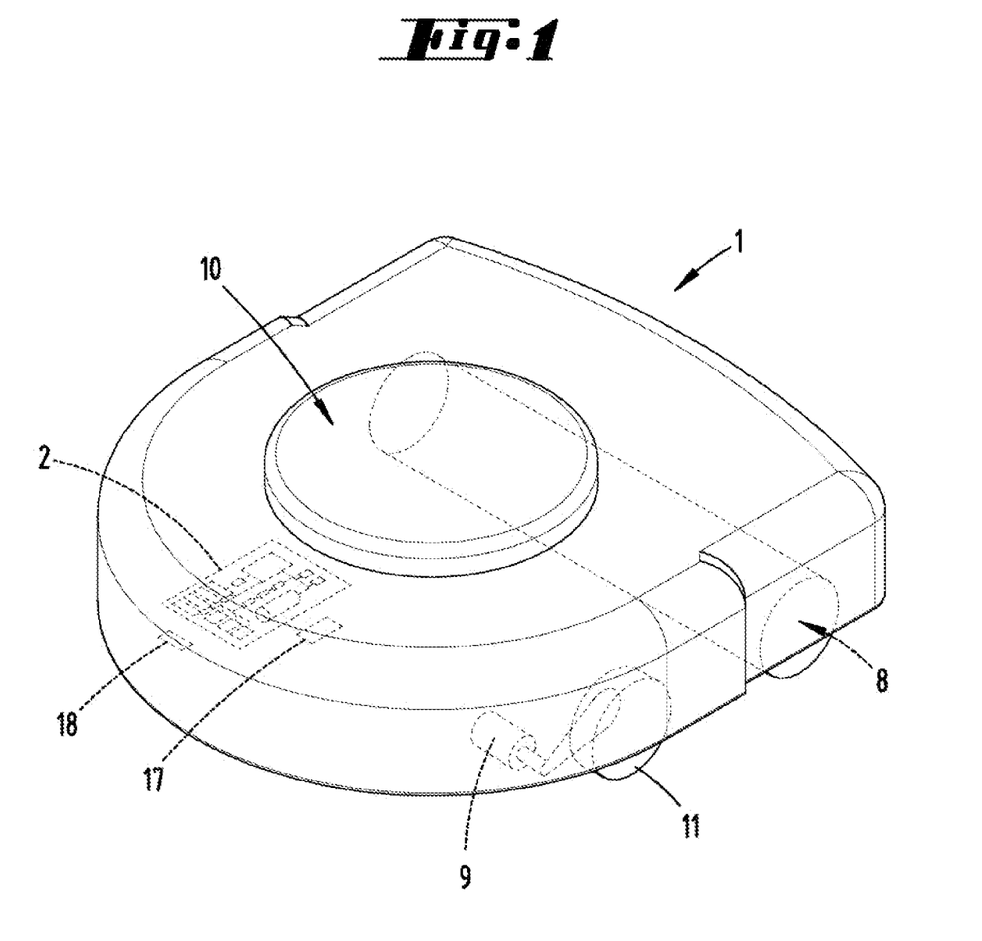
FIG. 1 is a floor processing device according to the invention.

FIG. 1 exemplarily shows a self-propelled floor processing device 1 moving within an environment, which here is designed as a vacuuming robot. The floor processing device 1 has a drive unit 9 in the form of an electric motor, which is allocated to a wheel 11 of the floor processing device 1. Here, for example, the floor processing device 1 has a total of two such motor-driven wheels 11 (only one shown on FIG. 1). Each drive unit 9 can further (not shown here) have allocated to it an odometry measuring unit, which measures a number of revolutions of the respective wheel 11 per unit time. A path distance covered by the floor processing device 1 can be determined from the latter. The floor processing device 1 further has a floor processing element 8 in the form of a cleaning brush that rotates around an essentially horizontal axis of rotation. The floor processing element 8 is likewise driven by means of an electric motor not shown in any more detail. Each electric motor of the floor processing device 1 can have allocated to it an undepicted detection unit that detects a power consumption of the electric motor. The measurement data recorded by the detection units can be analyzed by means of an evaluation unit 2, for example to detect an operating error of the floor processing device 1. The evaluation unit 2 is in the form of a computer processor and accesses a memory 17. In addition, the floor processing device 1 has a communication interface 18, via which a user can communicate with the floor processing device 1.

The floor processing device 1 also has an obstacle detection unit 10, which here for example is designed as a laser triangulation measuring unit, which (not shown here) is arranged within the housing of the floor processing device 1 and outwardly emits a light beam into the environment via reflecting elements. The obstacle detection unit 10 can preferably detect distances to obstacles 12 in a 360° area around the floor processing device 1. The evaluation unit 2 of the floor processing device 1 generates an area map 3 from these measured values (for example, see FIG. 2), based on which the floor processing device 1 can orient itself during a trip. The current position and orientation of the floor processing device 1 can also be determined and shown within the generated area map 3.

The evaluation unit 2 of the floor processing device 1 is set up to determine an error or a situation to be avoided with respect to the floor processing device 1 by evaluating the detection results of one or several detection units of the floor processing device 1. For example, an error or undesired situation is present when a movement of the floor processing device 1 takes too long, involves too many turning maneuvers, requires too much energy, includes an accident involving the floor processing device 1 and the like. For example, an accident situation can be present if the floor processing device 1 has gotten stuck on an obstacle 12, for example on a floor bracket of a swivel chair, and is unable to get out of the situation by itself or can do so only with an increased energy expenditure.

Figure 2:
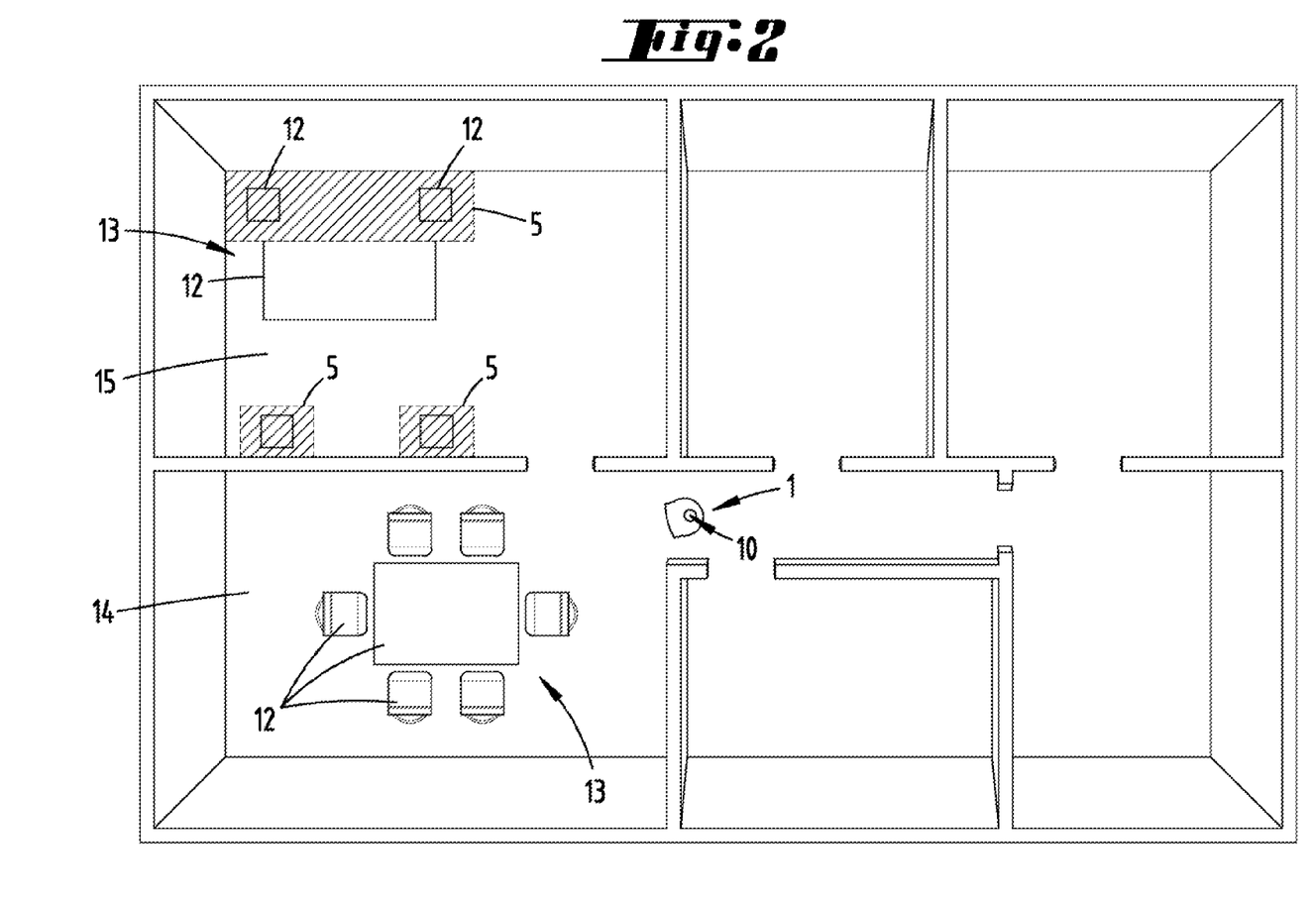
FIG. 2 is an environment with a plurality of partial environmental areas, and a floor processing device moving therein.
Figure 3:
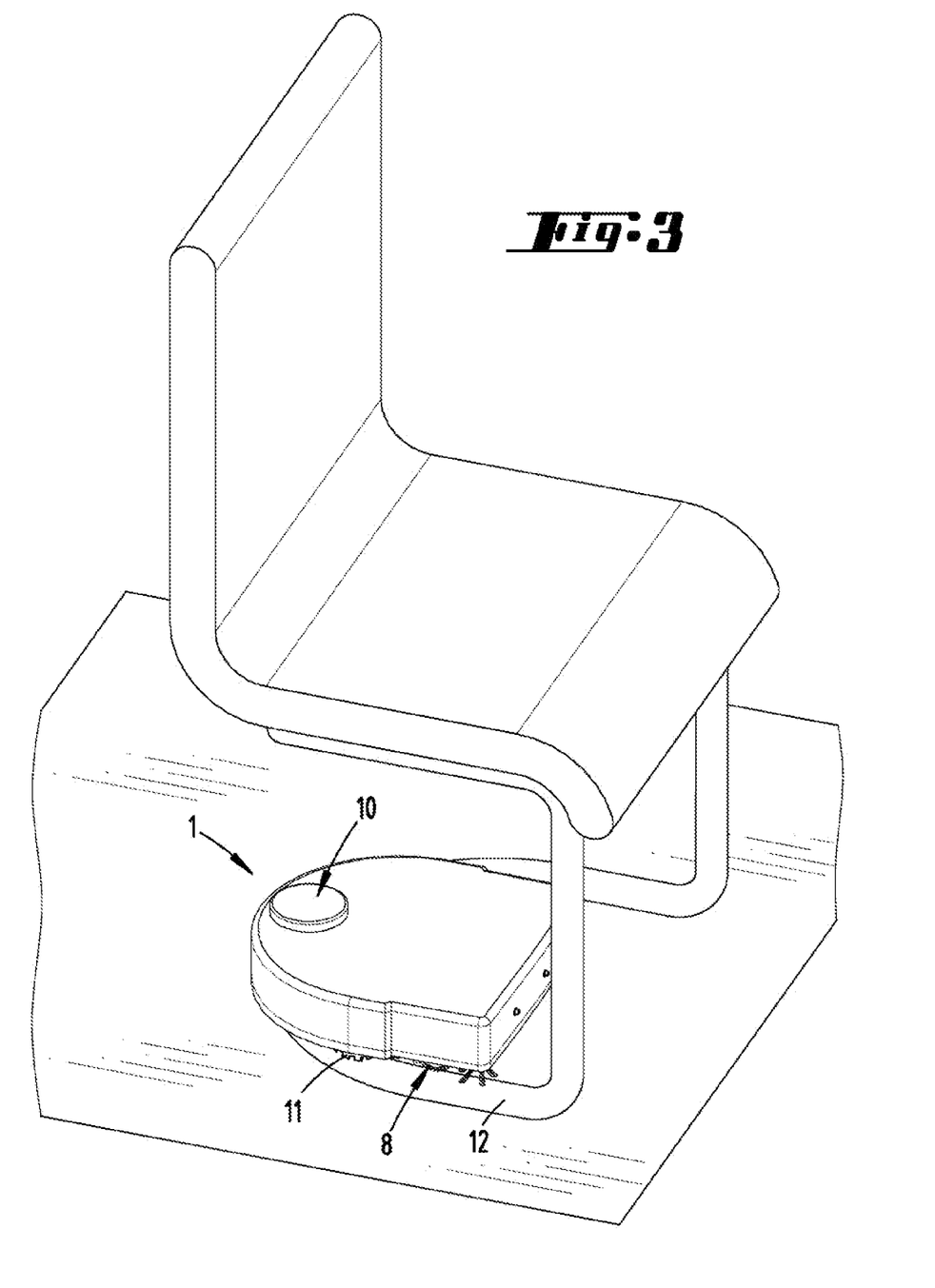
FIG. 3 is an error situation.

FIG. 2 shows a home environment with a plurality of rooms, which include among other a dining room 14 and a living room 15. At various locations within the dining room 14 and living room 15, there exist areas that are difficult for a self-propelled floor processing device 1 to process, for example because tight obstacles 12 exist there. For example, the dining room 14 here has a dining set with a table and six swivel chairs, wherein, as shown on FIG. 3, the swivel chairs have a floor backet as a foot part, on which the floor processing device 1 can at least partially sit, so that at least one of the wheels 11 loses contact with the surface to be cleaned. It is often not even possible for the floor processing device 1 to automatically free itself from such a situation. However, doing so requires at least an increased energy expenditure by a drive unit 9 of the wheels 11 or the floor processing element 8, in order to tilt the floor processing device 1 over the floor bracket, so that one or both wheels 11 of the floor processing device 1 once again come into contact with the floor. It goes without saying that such error situations of the floor processing device 1 should be avoided. In addition, there are other undesired situations of the floor processing device 1 which, while they do not involve any accidents and hence any complete inability of the floor processing device 1 to move, instead point to an abnormal behavior by the floor processing device 1 that is not desired by a user of the floor processing device, since this entails a longer time for processing the floor. For example, an undesired behavior by the floor processing device 1 is characterized by behavior parameters such as a lowered movement speed compared to a reference, a drift by the floor processing device, an increased stay of the floor processing device 1 in a specific partial environmental area compared to a reference, an increased number of turning maneuvers, an increased power consumption by a drive unit 9, or other factors. For example, in the living room 15 according to FIG. 2, narrow alleys or partial environmental areas may arise between various obstacles 12, here for example a sofa and nearby speakers, requiring that the floor processing device 1 perform a plurality of turning maneuvers for floor processing purposes. By comparison with free floor surfaces without obstacles 12, the floor processing device 1 thus remains in the respective partial environmental area for a very long time. According to the invention, no-go areas 5 are therefore automatically defined by the floor processing device 1 at such difficult to process partial environmental areas, which the floor processing device 1 must not traverse. No-go areas 5 are defined based on behavior parameters 4 of the floor processing device 1 that the evaluation unit 2 of the floor processing device 1 can detect. If a current behavior parameter 4 of the floor processing device 1 differs from permissible areas of a reference behavior parameter 6, an undesired situation can be defined, which then leads to a no-go area 5 being set up in the environment. This will be covered in more detail later on.

Figure 4:
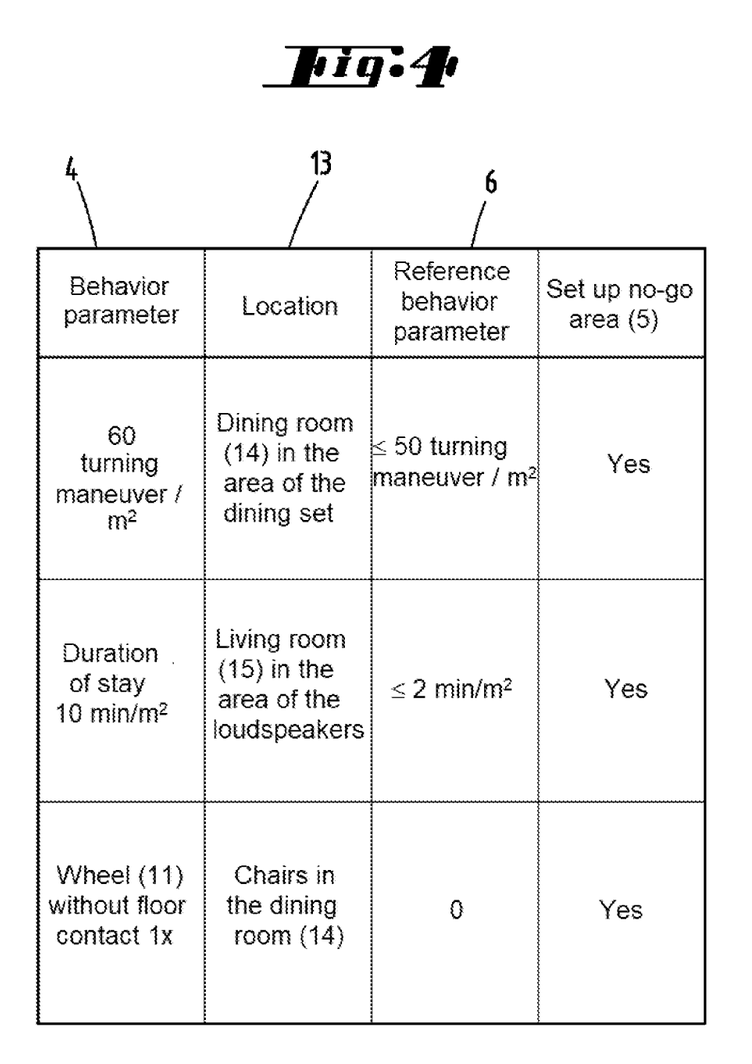
FIG. 4 is a schematic view of a table for comparing behavior parameters of the floor processing device with reference behavior parameters.

Initially shown purely schematically in tabular form on FIG. 4 is a basis of comparison, which the evaluation unit 2 of the floor processing device 1 uses to evaluate a current behavior of the floor processing device 1 as normal or abnormal. To this end, behavior parameters 4 are first established, which can be determined by a detection unit of the floor processing device. For example, these behavior parameters 4 here include a number of turning maneuvers per square meter, a stay of the floor processing device 1 per square meter, and an absent floor contact of a wheel 11. In addition, a plurality of other behavior parameters 4 can also be detected and evaluated, for example (but not limited to) an inclined position of the floor processing device 1 relative to the surface to be cleaned, a movement speed of the floor processing device 1, a drift of the floor processing device 1, a specific power consumption by a drive unit 9 of the floor processing device 1, and others. So-called reference behavior parameters 6 are stored in the memory 17 of the floor processing device 1 in relation to these behavior parameters 4, and used for a comparison of the actual behavior parameters 4 of the floor processing device 1. Defined here as reference behavior parameters 6 in the third column of the table shown on FIG. 4 are different value ranges, which still characterize a current behavior parameter 4 of the floor processing device 1 as "normal". A permissible value range for the reference behavior parameter 6 of 0 to 50 turning maneuvers per square meter is defined in relation to a number of turning maneuvers of the floor processing device 1. As a consequence, for example, if a current behavior parameter 4 of the floor processing device 1 measures 60 turning maneuvers per square meter, the current behavior parameter 4 lies outside of the value range for the reference behavior parameter 6, as a result of which the current situation of the floor processing device 1 is qualified as abnormal. For example, a reference behavior parameter 6 of 2 minutes per square meter is defined for a permissible stay of the floor processing device 1 per square meter of the environment. In addition, a behavior parameter 4 of the floor processing device 1 can be a missing floor contact of a wheel 11 of the floor processing device 1. Within the framework of a reference behavior parameter 6, it is here defined that the number of missing floor contacts can only assume the value "0". This means that already a single missing floor contact of a wheel 11 is qualified as abnormal. The current behavior parameters 4 shown in the first column of the table according to FIG. 4 are then compared with the permissible areas according to the defined reference behavior parameter 6, and a no-go area 5 is set up at the respective location 13 of the environment where the floor processing device 1 exhibits or exhibited an abnormal behavior. According to the example shown on FIG. 4, no-go areas 5 are here set up for all locations 13 that are exemplarily indicated (Set up no-go area (5): "yes").

Figure 5:
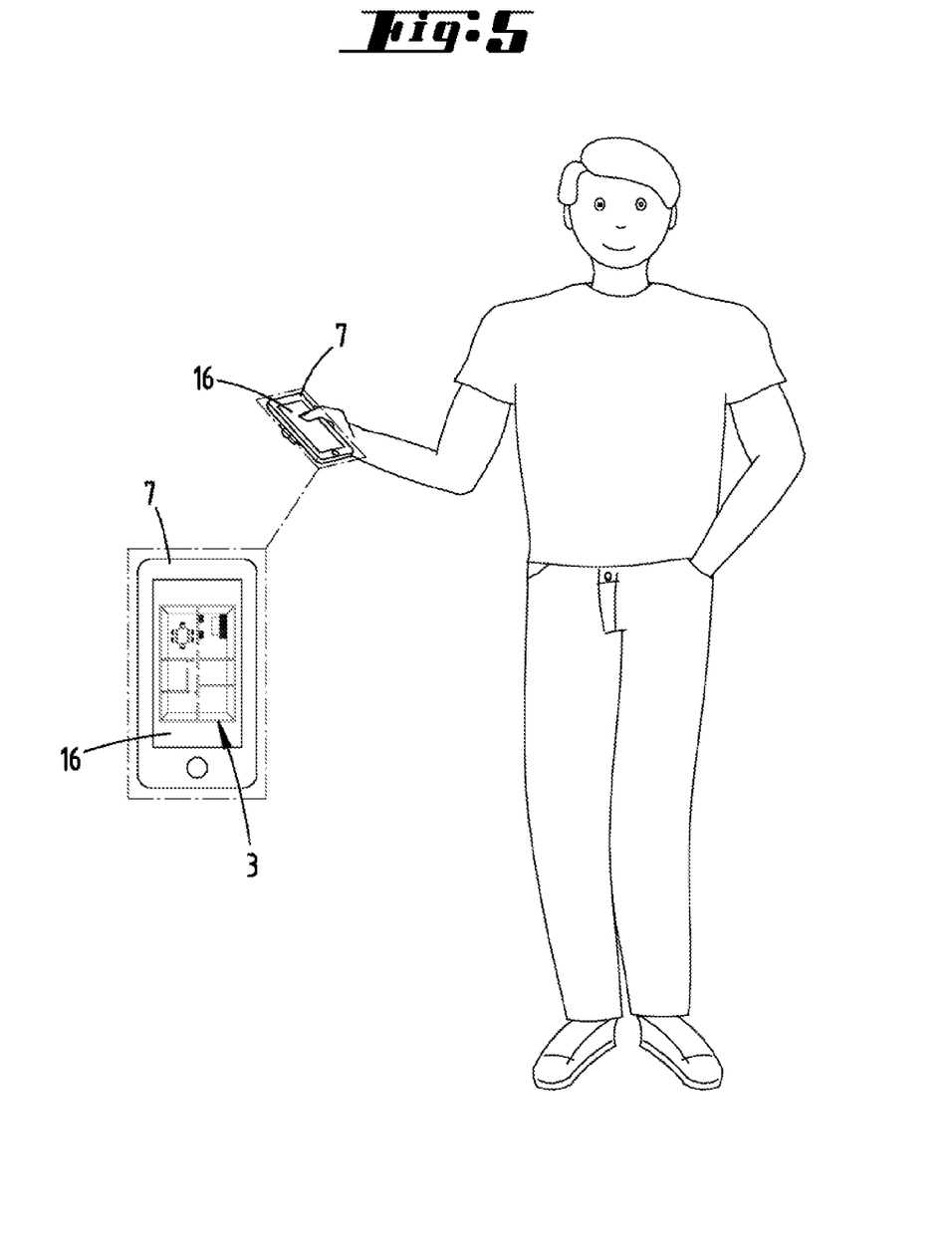
FIG. 5 is a user of the floor processing device with an external terminal for displaying an area map.

Finally, FIG. 5 shows a user of the floor processing device 1 with an external terminal 7, which here for example is a mobile phone. Other external terminals 7 are alternatively also possible for implementing the invention, of course, for example conventional tablet computers, laptops, or the like. The external terminal has a display 16 in the usual manner, which can display information to the user. Shown here on the display 16 of the external terminal 7 is an area map 3 of the environment, which shows the environment of the floor processing device 1 (environment according to FIG. 2). The display 16 is here preferably designed as a touchscreen, and can further be used by the user to make entries and communicate with the floor processing device 1 via its communication interface 18. For this purpose, an application is set up on the external terminal 7 that is suitable for controlling the floor processing device 1 and communicating with it.

The reference behavior parameters 6 defined on FIG. 4 can be predefined by a manufacturer of the floor processing device 1, or alternatively be defined by a user of the floor processing device 1. In addition, it is also possible that the manufacturer predefine reference behavior parameters 6, which the user can then select and/or change as desired, in order to adjust the tolerance of the floor processing device in relation to specific situations.

It will be explained below how the floor processing device 1 automatically defines no-go areas 5 within the environment, so that during future floor processing activities, the floor processing device 1 does not travel in the problematic partial environmental areas and there exhibit an undesired behavior, for example require too much time to perform the floor processing activity.

In order to enable the floor processing device 1 to avoid future problems and/or undesired situations within the environment, the current behavior parameters 4 of the floor processing device 1 within the environment are initially detected, after which the current behavior parameters 4 are analyzed and evaluated in relation to reference behavior parameters 6 defined by the manufacturer or the user. The actual behavior parameters 4 of the floor processing device 1, for example those recorded within the framework of a reconnaissance trip or processing trip, are detected to this end. During the trip, the floor processing device 1 traverses the environment based upon a predefined or random movement path, wherein the movement path preferably includes all partial environmental areas of the environment, and thus enables as complete a floor processing as possible of the respective partial environmental areas. To this end, the detection data of the detection units of the floor processing device 1 are analyzed by an algorithm of the evaluation unit 2 by comparing the current behavior parameters 4 with the predefined reference behavior parameters 6, specifically with value ranges which were predefined by the manufacturer or can be set or at least changed by the user. Deviations between the current behavior of the floor processing device 1 and an optimal behavior can be detected in this way. An essential basis is here formed by the mapping data of the obstacle detection unit 10 of the floor processing device 1, which are processed into an area map 3, and identify the obstacles 12 located in the environment.

Within the framework of the invention, there exist various possible scenarios for how the floor processing device 1 can detect undesired behaviors of the floor processing device 1 that can be attributed to specific environmental parameters, for example obstacles 12 in the environment. In one possible scenario, for example, an odometry sensor allocated to a driven wheel 11 of the floor processing device 1 can detect the actual movements of the floor processing device 1 in the environment. If no movement of the floor processing device 1 takes place within the environment despite the wheel 11 being driven, a spinning of the wheel 11 can be inferred. In addition, for example, if a position sensor simultaneously also determines that the floor processing device 1 is inclined, it can be concluded overall that the floor processing device 1 has hit an obstacle 12, for example according to the situation on FIG. 3, there specifically part of a floor bracket of a swivel chair. The analysis algorithm of the evaluation unit 2 combines the detected situation of the floor processing device 1 with the location coordinates in the area map 3. If this or other problems are encountered once or even repeatedly at the detected location 13, the evaluation unit 2 defines a no-go area 5 within the area map 3, so that the floor processing device 1 does not once again traverse this location 13 of the environment. As a result, the location 13 is permanently excluded from floor processing, thereby preventing a renewed accident problem. It can alternatively also be provided that the user, for example via the application installed on the external terminal 7, can define the floor processing operations for which the defined no-go areas 5 are to be applied or not. In particular, a no-go area 5 can only be considered for a specific operating mode of the floor processing device 1, for example during a floor processing operation with a low intensity, for example an eco-mode. By contrast, the no-go areas 5 can be traversed during an intensive floor processing operation, i.e., the floor processing device 1 ignores the no-go areas 5, and nevertheless travels over the respective partial environmental areas. In this regard, the user can define the relevance of the no-go areas 5, whether generally or for specific partial environmental areas. As a consequence, the no-go areas 5 can only be observed during specific floor processing modes, for example only during rapid cleaning, but not during intensive cleaning, wherein gradations are also possible with regard to energy consumption, for example of a drive unit 9 of the floor processing device 1. Therefore, how to handle the no-go lines or no-go areas 5 can be determined depending on the selection of the user. By contrast, however, partial environmental areas in which the floor processing device 1 regularly gets stuck can permanently and always be observed as no-go areas 5 for all floor processing modes, and thus be excluded from all floor processing activities and movement paths.

It is generally recommended that the evaluation unit 2 of the floor processing device 1 already evaluate problematic situations, i.e., behavior parameters 4 outside of the reference behavior parameter 6, during a first evaluation, and then suggest a no-go line or no-go area. The suggestion can preferably be displayed to the user on the display 16 of his or her external terminal 7. In particular, suggested no-go areas 5 can initially be marked as temporary in the area map 3. Should the user then desire a permanent entry of the no-go area 5 in the area map 3, he or she can confirm the transfer, for example via an input on the display 16. In addition, the application allows him or her to likewise preferably delete and adjust suggested or already stored no-go areas 5. Furthermore, a so-called heat map can also be shown to the user on the display 16 of the external terminal 7, which displays the frequency with which a specific behavior parameter 4 occurs along a movement path or generally in the environment. As a consequence, the user receives information about which partial environmental areas of the environment are especially error-prone for the floor processing device 1. Therefore, if the evaluation unit 2 of the floor processing device 1 does not automatically set a no-go area 5, the user can do so manually.

According to the table shown on FIG. 4, for example, another type of undesired behavior by the floor processing device 1 involves an excessive stay of the floor processing device 1 in a specific partial environmental area. For example, if the floor processing device 1 travels into the living room 15, which only has a small, obstacle-free movement area for the floor processing device 1 between the sofa and loudspeakers, the floor processing activity can result in very many turning movements, reversal maneuvers and/or double crossings of partial environmental areas, which requires a considerable expenditure of time and energy. For example, by measuring the stay of the floor processing device 1 per unit area, excessively difficult floor processing conditions can be inferred. The detected problem is allocated to the respective partial environmental area in the area map 3. If a problem is then encountered in this partial environmental area on one or even more than one occasion, this partial environmental area is automatically marked as a no-go area 5 in the area map 3. In future movements in proximity to this partial environmental area, the floor processing device 1 thus avoids the defined no-go area 5, so that the latter must then be manually cleaned by the user. In addition, individual operating modes of the floor processing device 1 can be defined, in which the partial environmental area labeled as a no-go area 5 is still traversed. For example, ignoring the no-go area 5 can be stipulated for an intensive cleaning mode.

Even narrow niches within a room are often a problem for a floor processing device 1 to traverse. If the floor processing device 1 is ideally aligned parallel to marginal edges of the niche, the floor processing device 1 can most often enter without any problem. However, if the floor processing device 1 reaches an end area of the niche, a straight reset is only possible with difficulty. The confined spaces also rule out any maneuvering and reversal, so that such partial environmental areas should also be detected as problematic, and labeled as a no-go area 5.

The type of floor covering in a partial environmental area can also hamper the movement of the floor processing device 1. For example, the high frictional resistance can considerably reduce the traveling speed on a carpeted floor with a relatively large pile height. In addition, a pole direction of the carpeting can cause a high frictional resistance and drift, so that the floor processing device 1 might be forced into a curve or oblique line, even though two wheels 11 are being identically driven. In these cases as well, the analysis of travel data detects a problem, and stores it in the area map 3 correspondingly to the location data of the respective location 13.

In order to identify no-go areas 5 within the area map 3, the evaluation unit 2 can specially visualize the area map 3 for the user on the external terminal 7. For example, the position of no-go lines or no-go areas 5 can here be shown highlighted in color. A representation as a heat map can also make sense, in which the frequency with which problem cases are encountered or a time spent in a specific partial environmental area are graphically visualized by the size of a defined symbol or a specific color scheme.

Although only a few embodiments of the present invention have been shown and described, it is to be understood that many changes and modifications may be made thereunto without departing from the spirit and scope of the invention.

REFERENCE LIST

1 Floor processing device
2 Evaluation unit
3 Area map
4 Behavior parameter
5 No-go area
6 Reference behavior parameter
7 External terminal
8 Floor processing element
9 Drive unit
10 Obstacle detection unit
11 Wheel
12 Obstacle
13 Location
14 Dining room
15 Living room
16 Display
17 Memory
18 Communication interface

What is claimed is:
1. A self-propelled floor processing device comprising:
a drive unit connected to at least one wheel;
an evaluation unit; and
a memory,
wherein the evaluation unit is configured:
  to navigate the floor processing device within an environment based on an area map,
  during a movement of the floor processing device, to determine a behavior parameter of the floor processing device and a movement path of the floor processing device, wherein the behavior parameter enables the evaluation unit to differentiate between a behavior of the floor processing device defined as proper during floor processing and a behavior of the floor processing device defined as an error behavior, to access at least one reference behavior parameter that is characteristic for an error behavior and stored in the memory, and compare the determined behavior parameter with the at least one reference behavior parameter, to determine the error behavior depending on the comparison result, to define a location of the movement path at which the error behavior was determined as a no-go area which the floor processing device must not traverse, to enter the no-go area in the area map or change a no-go area already entered in the area map, and to navigate the floor processing device by controlling the drive unit so that the floor processing device does not traverse the no-go area entered in the area map, so as to avoid an error behavior, wherein the memory contains at least one reference behavior parameter selected from the following group: a defined movement speed of the floor processing device, a defined drift of the floor processing device, a defined number of turning maneuvers of the floor processing device per defined partial area of the environment, a defined power consumption of the drive unit of the floor processing device per unit time.

2. The self-propelled floor processing device according to claim 1, wherein the error behavior of the floor processing device is selected from the following group: an accident involving the floor processing device, a stay of the floor processing device at a location of the movement path that is longer than a defined maximum stay, a power consumption of the drive unit of the floor processing device that exceeds a defined maximum power consumption.

3. The self-propelled floor processing device according to claim 1, further comprising a communication interface, via which a user of the floor processing device transmits a reference behavior parameter to the memory, or changes or deletes a reference behavior parameter predefined in the memory by the manufacturer.

4. The self-propelled floor processing device according to claim 1, wherein the evaluation unit is configured to define a no-go area for a first operating mode of the floor processing device that deviates from a no-go area for a second operating mode of the floor processing device, so that different specifications relative to a definition of the no-go area are made for different operating modes.

5. The self-propelled floor processing device according to claim 4, wherein the first operating mode and second operating mode involve a floor processing operation with a specific processing intensity of a floor to be processed.

6. The self-propelled floor processing device according to claim 4, wherein a location of the movement path for the first operating mode is defined as a no-go area, and wherein the same location of the movement path for the second operating mode is not defined as a no-go area.

7. The self-propelled floor processing device according to claim 4, wherein the first operating mode involves an intensive cleaning of the location of the movement path to be processed, and wherein the second operating mode involves an eco-mode with a lower intensity of cleaning for the same location to be processed.

8. A self-propelled floor processing device comprising:
a drive unit connected to at least one wheel; and
an evaluation unit that is configured to navigate the floor processing device within an environment based on an area map by controlling the drive unit, and, during a movement of the floor processing device, to determine a behavior parameter of the floor processing device and a movement path of the floor processing device, wherein the evaluation unit is configured to analyze the behavior parameter and movement path, automatically determine a no-go area which the floor processing device must not traverse depending on the result of the analysis, and enter the determined no-go area in the area map or change a no-go area already entered in the area map, wherein the evaluation unit is configured to compare the behavior parameter with at least one defined reference behavior parameter, wherein the reference behavior parameter is selected from the following group: a defined movement speed of the floor processing device, a defined drift of the floor processing device, a defined number of turning maneuvers of the floor processing device per defined partial area of the environment, a defined power consumption of the drive unit of the floor processing device per unit time.

9. The floor processing device according to claim 8, wherein the reference behavior parameter is predefined by a manufacturer of the floor processing device, or is defined manually by a user of the floor processing device.

10. The floor processing device according to claim 8, wherein the evaluation unit is set up to display the determined no-go area in the area map to a user.

11. The floor processing device according to claim 10, wherein the evaluation unit is set up to transmit the determined no-go area to an external terminal that communicates with the floor processing device.

12. The floor processing device according to claim 8, wherein the evaluation unit is configured to display the determined no-go area to a user as provisionally marked before the no-go area is stored in the area map.

13. The floor processing device according to claim 12, wherein the evaluation unit is configured to prompt the user to confirm storage of the no-go area.

14. The floor processing device according to claim 8, wherein the evaluation unit is configured to define a no-go area only for consideration during a specific operating mode of the floor processing device.

15. The floor processing device according to claim 14, wherein the operating mode involves processing a floor with a specific processing intensity.

16. The floor processing device according to claim 8, wherein the evaluation unit is configured to display a frequency with which a specific behavior parameter of the floor processing device arises along the movement path to a user in the area map.

17. The floor processing device according to claim 16, wherein the evaluation unit is configured to display the frequency in a heat map.

18. A method for operating a self-propelled floor processing device, comprising:
navigating the floor processing device with an evaluation unit of the floor processing device within an environment based on an area map, during a movement of the floor processing device, determining a behavior parameter of the floor processing device and a movement path of the floor processing device, analyzing with the evaluation unit the behavior parameter and the movement path, automatically determining with the evaluation unit a no-go area which the floor processing device must not traverse depending on the result of the analysis, entering with the evaluation unit the determined no-go area in the area map or changing a no-go area already entered in the area map, wherein the evaluation unit compares the behavior parameter with at least one defined reference behavior parameter, wherein the reference behavior parameter is selected from the following group: a defined movement speed of the floor processing device, a defined drift of the floor processing device, a defined number of turning maneuvers of the floor processing device per defined partial area of the environment, a defined power consumption of a drive unit of the floor processing device per unit time.

19. The method according to claim 18, wherein the floor processing device comprises:
   the drive unit connected to at least one wheel,
   the evaluation unit configured to navigate the floor processing device within the environment based on the area map by controlling the drive unit, and, during the movement of the floor processing device, to determine the behavior parameter of the floor processing device and the movement path of the floor processing device, wherein the evaluation unit is configured to analyze the behavior parameter and movement path, automatically determine the no-go area which the floor processing device must not traverse depending on the result of the analysis, and enter the determined no-go area in the area map or change the no-go area already entered in the area map, wherein the evaluation unit is configured to compare the behavior parameter with the at least one defined reference behavior parameter, wherein the reference behavior parameter is selected from the following group: the defined movement speed of the floor processing device, the defined drift of the floor processing device, the defined number of turning maneuvers of the floor processing device per defined partial area of the environment, the defined power consumption of the drive unit of the floor processing device per unit time.

* * * * *